US005371655A

United States Patent [19]

Murdock et al.

[11] Patent Number: 5,371,655

[45] Date of Patent: Dec. 6, 1994

[54] SYSTEM FOR VARYING LIGHT INTENSITY SUCH AS FOR USE IN MOTION PICTURE PHOTOGRAPHY

[75] Inventors: Nolan J. Murdock; Felipe Navarro, both of Granada Hills, Calif.

[73] Assignee: Panavision International, L.P., New York, N.Y.

[21] Appl. No.: 887,276

[22] Filed: May 22, 1992

[51] Int. Cl.[5] .......... G03B 15/02

[52] U.S. Cl. .......... 362/18; 362/17; 362/293; 362/323; 354/126; 359/888

[58] Field of Search .......... 362/16, 17, 18, 293, 362/343, 323, 324; 356/418, 419; 359/888; 354/126, 131

[56] References Cited

U.S. PATENT DOCUMENTS

| | | | |
|---|---|---|---|
| 1,820,899 | 8/1931 | Greenewalt | 362/231 |
| 3,883,243 | 5/1975 | Weiglas et al. | 355/35 |
| 4,015,113 | 3/1977 | Gottschalk | 240/41.35 R |
| 4,232,359 | 11/1980 | Leon et al. | 362/268 |
| 4,392,187 | 7/1983 | Bornhorst | 362/233 |
| 4,527,198 | 7/1985 | Callahan | 358/185 |
| 4,535,394 | 8/1985 | Dugre | 362/293 X |
| 4,600,976 | 7/1986 | Callahan | 362/277 |
| 4,602,321 | 7/1986 | Bornhorst | 362/268 |
| 4,800,474 | 1/1989 | Bornhorst | 362/293 |
| 4,890,208 | 12/1989 | Izenour | 362/294 |
| 4,891,738 | 1/1990 | Richardson et al. | 362/282 |
| 4,893,225 | 1/1990 | Solomon | 362/293 |
| 4,897,770 | 1/1990 | Solomon | 362/293 |
| 4,914,556 | 3/1990 | Richardson | 362/293 |
| 4,958,265 | 9/1990 | Solomon | 362/293 |
| 4,972,306 | 11/1990 | Bornhorst | 362/278 |
| 4,984,143 | 1/1991 | Richardson | 362/323 X |

FOREIGN PATENT DOCUMENTS

| | | |
|---|---|---|
| 2465155 | 3/1981 | France . |
| 3609947 | 1/1987 | Germany . |
| 2031138 | 4/1980 | United Kingdom . |

OTHER PUBLICATIONS

Catalog, Reynard Enterprises, Inc., Laguna Niguel, Calif. pp. 30–31 (no date).

*Primary Examiner*—Stephen F. Husar
*Attorney, Agent, or Firm*—Lyon & Lyon

[57] ABSTRACT

A lighting system and method with variable light intensity for use in motion picture photography. In the lighting apparatus, light emitted from a source is passed through an aperture and then through a section of a movable, neutral density filter. The preferred filter is specially designed to have a variable density, continuously increasing from one side of the filter to the other. By changing the position of the filter, selectively placing higher or lower density sections in the light path, the intensity of the light emitted by the lighting apparatus may be varied. The neutral density filter is selected to be generally color neutral so that the color quality of the light passing therethrough remains unchanged.

32 Claims, 5 Drawing Sheets

FIG. 2.
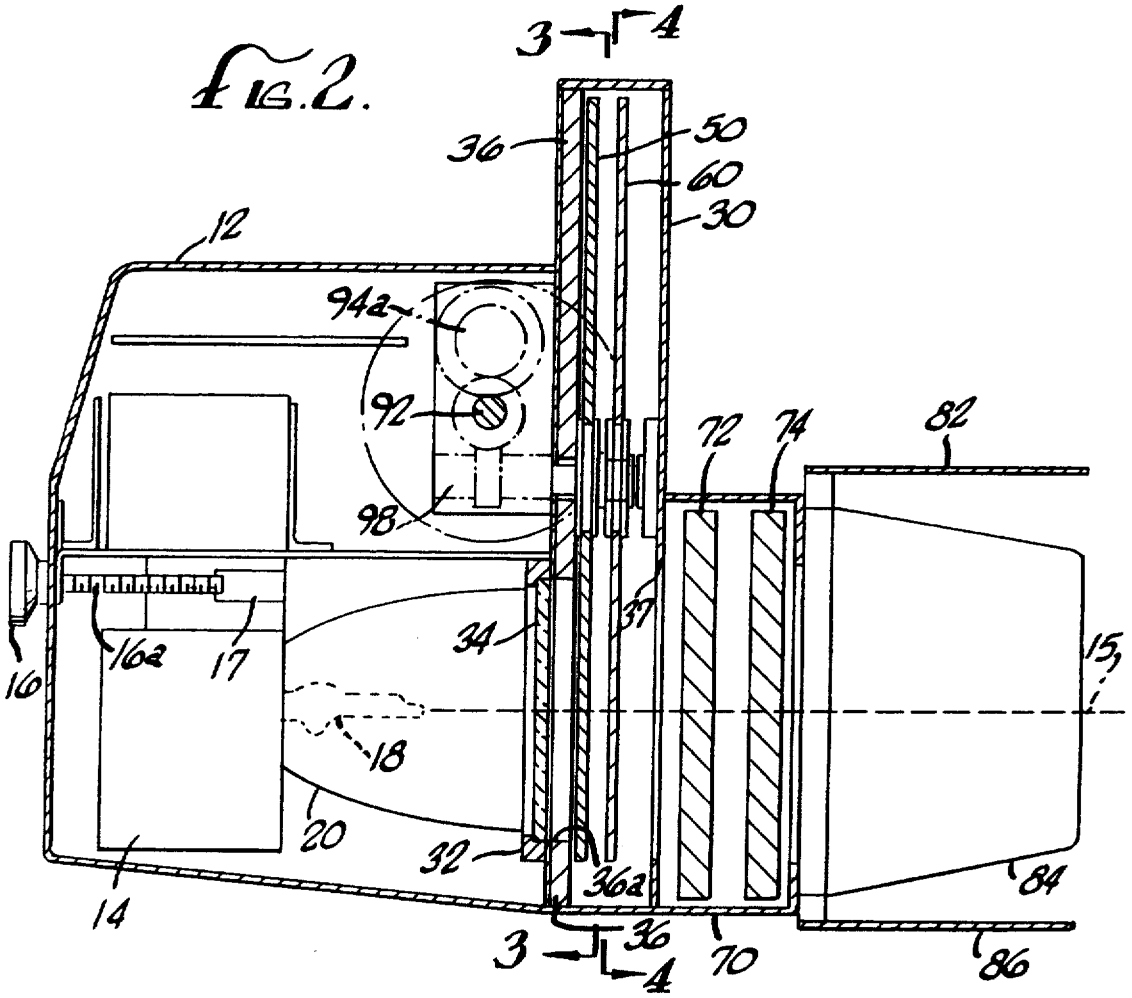
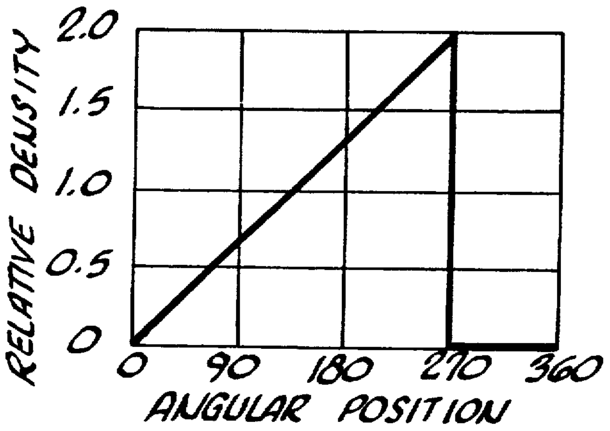
FIG. 6.

FIG. 3.
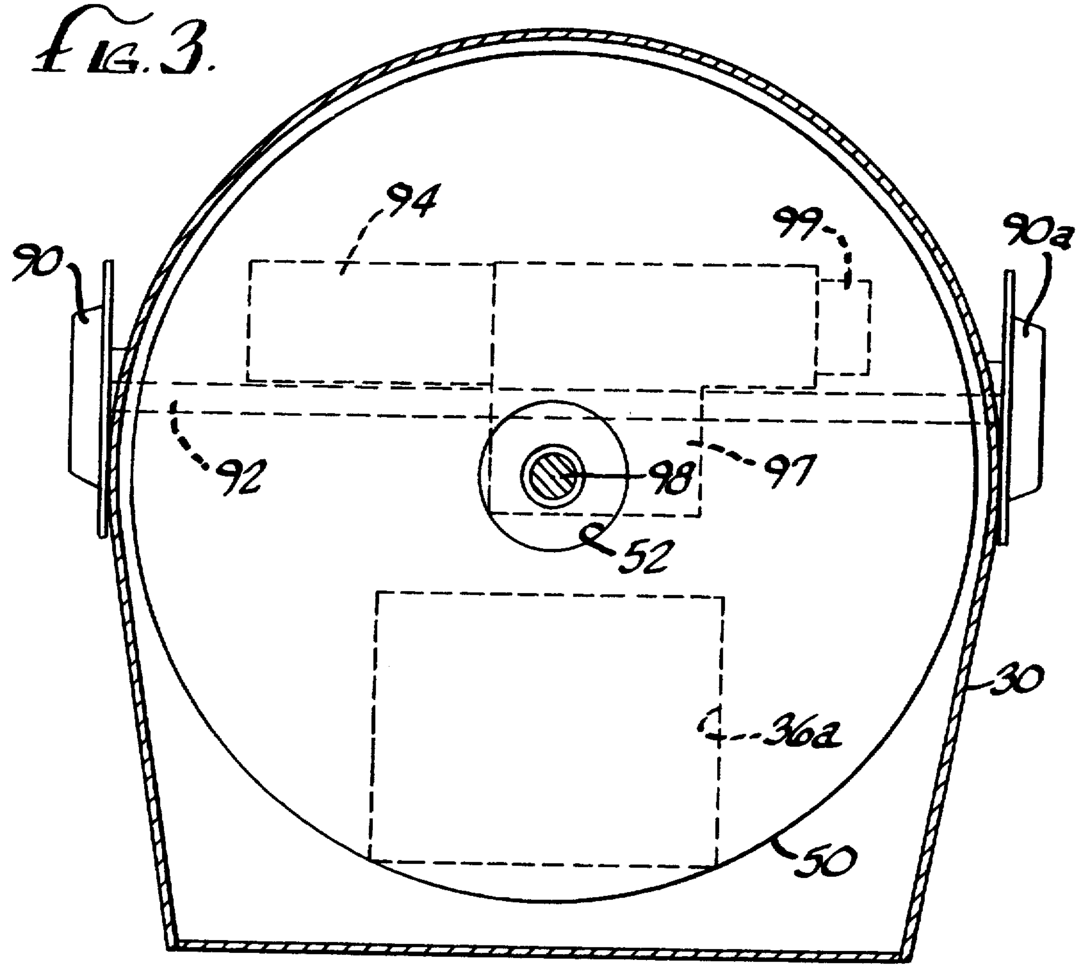
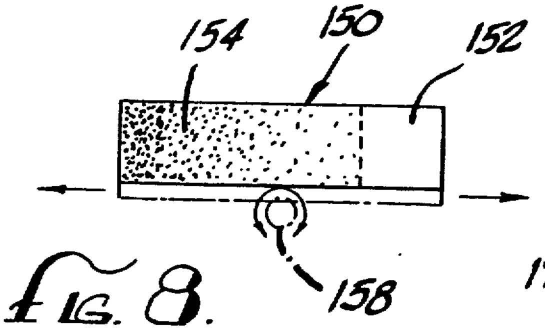
FIG. 8.
FIG. 9.
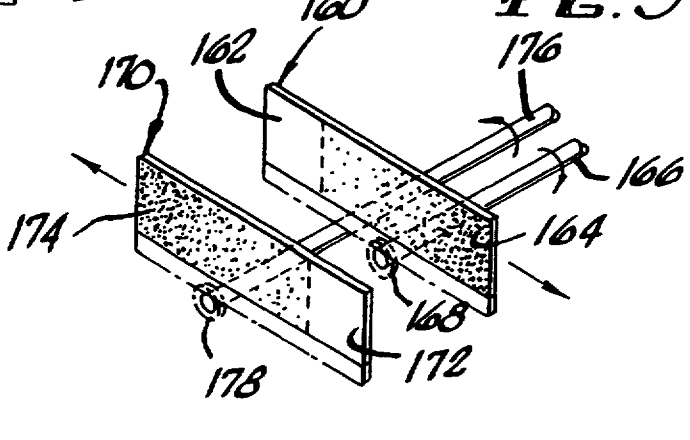

SYSTEM FOR VARYING LIGHT INTENSITY SUCH AS FOR USE IN MOTION PICTURE PHOTOGRAPHY

BACKGROUND OF THE INVENTION

The field of the present invention relates to lighting apparatus such as may be particularly used for varying the intensity of light produced by a light source for use in motion picture photography such as film and video.

In a motion picture production, it is often advantageous to vary the amount of light on a subject. One such occurrence is when a subject is moved progressively closer to the camera and light source during filming. When employing an artificial light source, the intensity may be varied by changing the power input to the light such as through a rheostat. However as the intensity is varied, the color quality or color temperature is also varied. Though such color change may not be perceptible to the human eye, color film is easily affected by color quality change.

U.S. Pat. No. 4,015,113 discloses a variable intensity light source in which light from a lighting element is directed against a reflector. The reflector has adjustable degrees of reflectivity being comprised of a plurality of rotatable cylindrical rollers, each roller having half of its surface coated with a black, nonreflective material. As the rollers are rotated, the intensity of light is varied without changing color quality. Other devices have included shutter elements interposed in the light path, the elements opening or closing to vary the amount of light transmitted or reflected.

The present inventors have recognized that some of these existing designs may have limitations including size, weight, efficiency, color control, and/or versatility and alternate designs would be desirable for certain applications.

SUMMARY OF THE INVENTION

The present invention relates to a lighting apparatus and method for varying the light intensity from a light source for use in motion picture photography including both film and video. In the lighting apparatus, light emitted from a source is passed through an aperture and then through a section of a movable, neutral density filter. The preferred filter is specially designed to have a variable density, continuously increasing from one side of the filter to the other. By changing the position of the filter, selectively placing higher or lower density sections in the light path, the intensity of the light emitted by the lighting apparatus may be varied. The neutral density filter is selected to be generally color neutral so that the color quality of the light passing therethrough remains unchanged.

BRIEF DESCRIPTION OF THE DRAWINGS

FIG. 2 is a cross sectional view of the light apparatus of FIG. 1;

FIG. 3 is a cross sectional view of FIG. 2 taken along line 3—3;

FIG. 6 is a graph of the relative density vs. angular position of a preferred disk design for the variable density filter;

FIG. 8 is an alternate embodiment for the variable density filter comprising a rectangular design; and FIG. 9 is another alternate embodiment for the variable density filter comprising a dual rectangular design.

DETAILED DESCRIPTION OF THE PREFERRED EMBODIMENT

Figure 1:
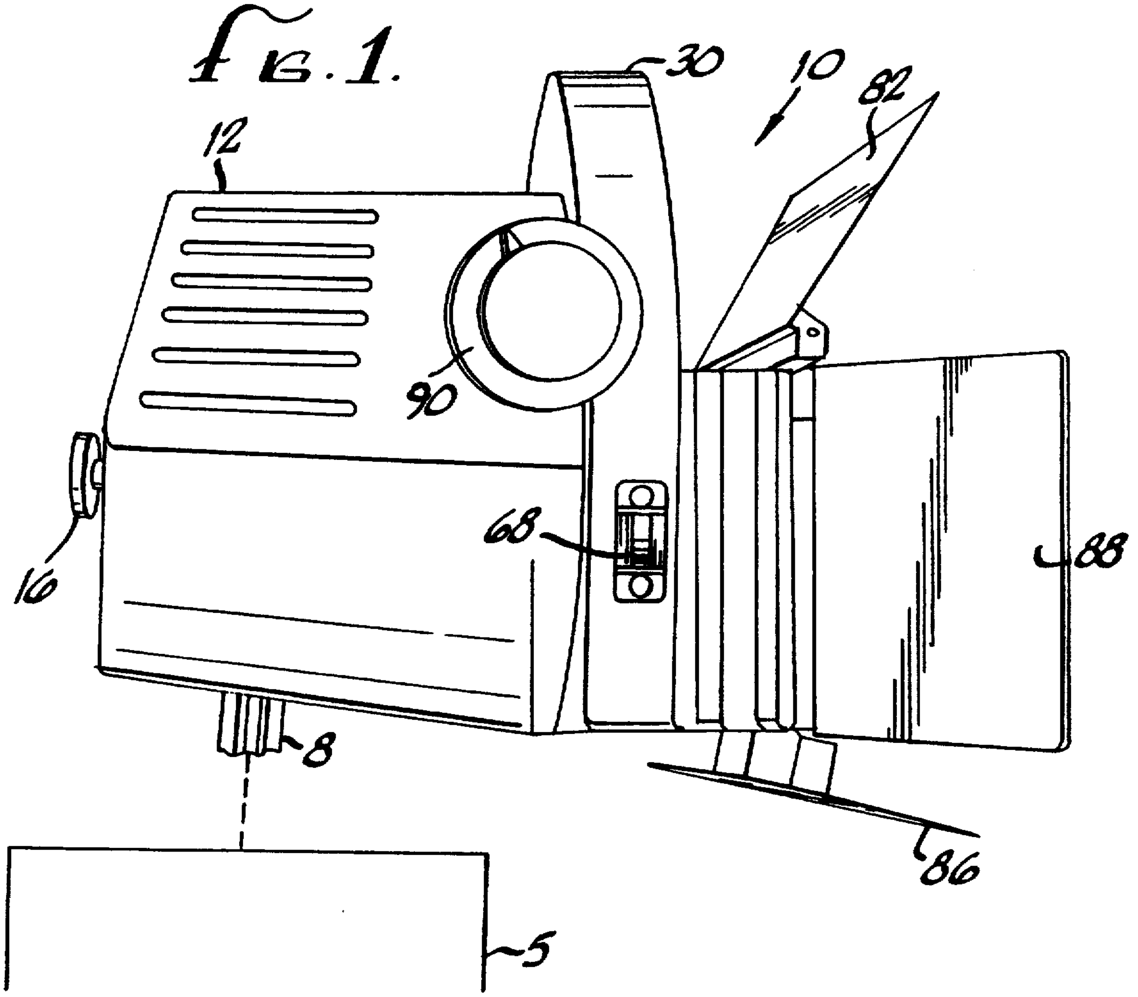
FIG. 1 is a side elevation view of a light apparatus according to the present invention.

The preferred embodiment will now be described with respect to the drawings. To simplify the description, any numeral identifying an element in one figure will represent the same element in any other figure.

FIGS. 1–4 illustrate a lighting apparatus 10 which is mountable by a bracket 8 to suitable supporting location such as camera 5. The lighting apparatus 10 includes a main housing 12 with a front wheel housing 30, a filter housing 70, and the barn door assembly 82, 84, 86, 88 attached to the front thereof.

Light emitted from light source 18, which is typically an electric lamp. Typically professional light sources employ a halide-metal (HMI) element, a xenon element, or a more standard lower output incandescent lamp. A light source 18 is positioned in the center of a reflector 20 which directs light from the light source 18 out along an outgoing light path 15. The relative axial position of the lighting element 18 to the reflector 20 may be adjusted by an adjustment mechanism consisting of an adjustment knob 16 attached to a screw **16*a* which axially translates a bracket 17. The bracket 17 is attached to the socket assembly carrier 14 into which the lamp 18 is plugged. Rotation of the knob 16 axially translates the socket carrier 14 thereby adjusting the relative position of the lamp 18 to the reflector 20 for focusing of the outgoing light beam along light path 15**.

Light from the lamp 18 and the reflector 20 passes through a heat shield 34 which is typically a glass element designed to permit unaffected transmission of light but inhibit transmission of heat therethrough. Upon exiting heat shield 34, the light then passes through an aperture **36*a* in the back plate 36. The aperture 36*a* is a rectangular aperture of desired dimensions. The light then passes through a neutral density filter disk 50 positioned in front of the aperture 36*a*. The neutral density filter 50 is positioned so that light exiting through aperture 36*a* passes through a lower section of the neutral density filter disk 50. The disk 50 has a center hole 52 and is mounted to shaft 98 and flange 96 by a retainer ring 54. The disk 50 is rotatable through rotation of shaft 98. Drive shaft 98 is rotationally operated by a transmission 97 which is alternatively operated by a motor 94 or a manual drive shaft 92. The manual drive shaft 92 is operable on either side of the lighting apparatus 10 through operation of knobs 90, 90*a*. The motor 94 is controlled by a controller 100 which in turn is operable from a signal transmitter 110 described in more detail below. The controller 100 is also in communication with a transducer/limiter 99 which provides a signal indicating the angular position of the motor shaft 94*a* and consequently the angular position of the shaft 98 and the disk 50**.

The neutral density disk 50 is preferably designed as shown in FIG. 6 to have a clear section of 90° arc, the clear section having a relative density of approximately zero. Over an angular position from zero to 270°, the relative density of the disk 50 increases linearly from approximately zero to a relative density of about 2.0. In a preferred embodiment, the relative density increases linearly from approximately zero to approximately 3.0. The neutral density filter disk 50 linearly attenuates light passing therethrough with the relative angular disk position disk providing increasing or decreasing attenuation as a higher or lower density disk section is positioned in front of the aperture 36a through which the light passes.

The neutral density filter is preferably designed to be relatively color neutral meaning that light passing therethrough does not change in color quality or color temperature.

In the preferred application, the neutral density disk has an outside diameter 175 mm and an inside center hole of approximately 25.4 mm. The disk is preferably constructed with a Pyrex TM (or equivalent material) substrate which is coated with neutral density filter material to achieve a design with the desired light transmission characteristics. Alternately the substrate may be comprised of fused silica which is also a material which has a low thermal expansion coefficient and high thermal shock value. The disk is preferably designed to attenuate light without causing change in color quality or color temperature. Such a disk is available from Reynard Enterprises, Inc. of Laguna Niguel, Calif., USA.

In an alternative configuration, the signal element 110 and/or the controller 100 may be connected both to the motor 94 and another system actuator 115 such as the motor for the lens focusing system. The lighting apparatus control and the lens focusing system control each have two channels, each having control ranges separately set. For example, a system may be calibrated with one end of the controller range setting the lighting apparatus at 20% intensity and the lens focus at 1 meter, the other end of the range being calibrated to be 80% for the lighting apparatus and the lens focus at 10 meters. Points in between the two limits are then interpolated by a suitable algorithm. Such a system allows for automatic adjustment of light intensity as the lens is focused tracking the change in the distance to the subject.

The signal element 110 such as a signal emitter may be a rotatable dial mounted on the lighting apparatus 10 itself or may be a radio-controlled apparatus located at some distance from the lighting apparatus 10. In the preferred configuration, a signal produced from the actuator 115 may be taken from a camera lens focus mechanism such that the light intensity may be automatically varied as the camera lens is focused. In the application where a subject is moving toward or away from the camera, the camera operator is continually adjusting the focus of the camera lens. With the signal element 110 tied into the camera lens focus mechanism, the signal provided to the controller 100 from the signal element 110 permits automatic adjustment of the light intensity to compensate for the changing distance of the subject to the camera.

The signal element 110 may be any desired signal generator providing a signal to controller 100 such as an electronic or radio-controlled actuator. Though a conventional analog signal may be used, a digitized signal may be employed to provide more precise control. The actuator 115 may be any suitable mechanism including a lens focus mechanism, a lens aperture adjustment device, camera shutter opening control device, or an automatic light exposure device.

After passing through the neutral density disk 50, the light passes through a color wheel 60. The color wheel 60 has a center opening 62 which is mounted on shaft 98 by a retainer ring 64 with fitting 65 locking the elements in place. The color wheel 60 is essentially another filter disk having light transmission properties, such as achievable by special coatings, which alters the color quality of light passing therethrough by a desired amount. In similar geometry to the neutral density disk 50, the color correct wheel 60 has a 90° clear section and a 270° color correcting section of linearly increasing density from approximately a zero color quality correcting effect to a maximum desired color quality correction effect.

The values of color correction will be selected dependent upon the particular application. For example, a typical lamp for a lighting apparatus is a halide metal variety in which the color temperature of a new lamp ranges from approximately 5600°-6000° K. As the lamp ages, the color temperature drops such that after approximately 300-500 hours of use, the color temperature of the light produced has dropped to such a degree that it is unusable. The color correct wheel filter 60 will correct for this change in color temperature by allowing the user, by manipulation of thumb wheels 68, to rotate the color correct wheel 60 thereby selectively positioning a gradually increasing (or decreasing) color quality correcting effect in the outgoing light path. Such a disk is also available from Reynard Enterprises, Inc. of Laguna Niguel, Calif. A color correct wheel 60 may also be used to select the desired color temperature of light produced by the lighting apparatus 10 to provide desired lighting effects and to match or tune the light of the lighting apparatus 10 to other filming light sources. The color correct wheel 60 may be remotely controlled or otherwise linked to a desired output control. For example, the position of the color correct wheel 60 may be automatically adjusted to correct to correspond to lamp temperature or some other lighting factor.

Once past the color correct wheel 60, light passes through a second aperture 37 and out through a conventional filter housing 70 in which a plurality of rectangular filters 72, 74 may be inserted. A conventional set of barn doors 82, 84, 86, 88 are positioned on the outer portion of the filter housing 70, the doors being pivotable to provide the desired aiming effect.

In the application where there is a single neutral density filter disk 50 providing light attenuation, it would appear that because the filter is of higher density on one side of the aperture 36a than on the other side of the aperture 36a that light impinging on a subject might be darker on one side, such as darker on the left and lighter on the right. To correct for such an effect, the filters 72 and/or 74 may comprise a diffuser which will reflect and diffuse the light so as to compensate for any intensity imbalance across a light plane.

Tables A, B, and C show test results of measured light intensities from a lighting apparatus as illustrated measured at a projection screen 6 feet (1.8 meters) and 12 feet (3.6 meters) from the lighting apparatus. For example, as shown in Table A, without a diffuser, at 50% attenuation the measured light intensity varies from 21 lumens on the left to 15 lumens on the right (at a distance of 6 feet (1.8 m)). Placing a single diffuser in position (downstream of the neutral density filter), Table B shows at 50% attenuation the relative intensity on the left is 9 lumens while the relative intensity at the right is 8.2 lumens. Such an intensity variation is within acceptable limits. Such a device, therefore, requires only a single neutral density filter disk resulting in an apparatus of minimum size, weight and cost. Placing a second diffuser in position (downstream of the neutral density filter), Table C shows at 50% attenuation the relative intensity on the left is 4.5 lumens while the relative intensity at the right is 4.6 lumens (at a distance of 6 feet (1.8 m)). With two diffusers, side to side intensity variation is essentially eliminated.

TABLE A

Without diffuser

| FILTER DENSITY (%) | POSITION Center | 2.1 meter left | 2.1 meter right |
|---|---|---|---|
| | DISTANCE = 6 ft. (1.8 m) | | |
| 0% | 67 (lumens) | 31 | 33.4 |
| 50% | 33 | 21 | 15 |
| | DISTANCE = 12 ft. (3.6 m) | | |
| | Center | 2.5 meter left | 2.5 meter right |
| 0% | 17.4 | 8 | 9.5 |
| 50% | 8.7 | 5.8 | 3.4 |

TABLE B

With one diffuser

| FILTER DENSITY (%) | POSITION Center | 2.1 meter left | 2.1 meter right |
|---|---|---|---|
| | DISTANCE = 6 ft. (1.8 m) | | |
| 0% | 30 (lumens) | 13.6 | 14 |
| 50% | 17 | 9 | 8.2 |
| | DISTANCE = 12 ft. (3.6 m) | | |
| 0% | 7.7 | 3 | 4 |
| 50% | 3.9 | 1.9 | 1.9 |

TABLE C

With two diffusers

| FILTER DENSITY (%) | POSITION Center | 2.1 meter left | 2.1 meter right |
|---|---|---|---|
| | DISTANCE = 6 ft. (1.8 m) | | |
| 0% | 16.3 (lumens) | 8.6 | 9.1 |
| 50% | 8.8 | 4.5 | 4.6 |
| | DISTANCE = 12 ft. (3.6 m) | | |
| 0% | 4.3 | 2.0 | 2.5 |
| 50% | 2.2 | 1.1 | 1.2 |

Though the examples illustrated in the tables refer to side to side attenuation variation, the diffusers also compensate for variation in the vertical direction.

Figure 7:
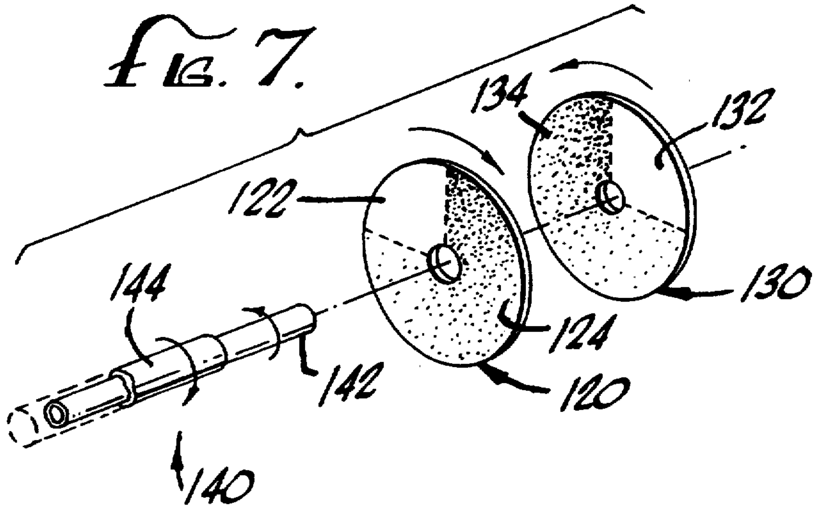
FIG. 7 is a diagrammatic view of an alternate embodiment comprising a dual disk design.
Figure 4:
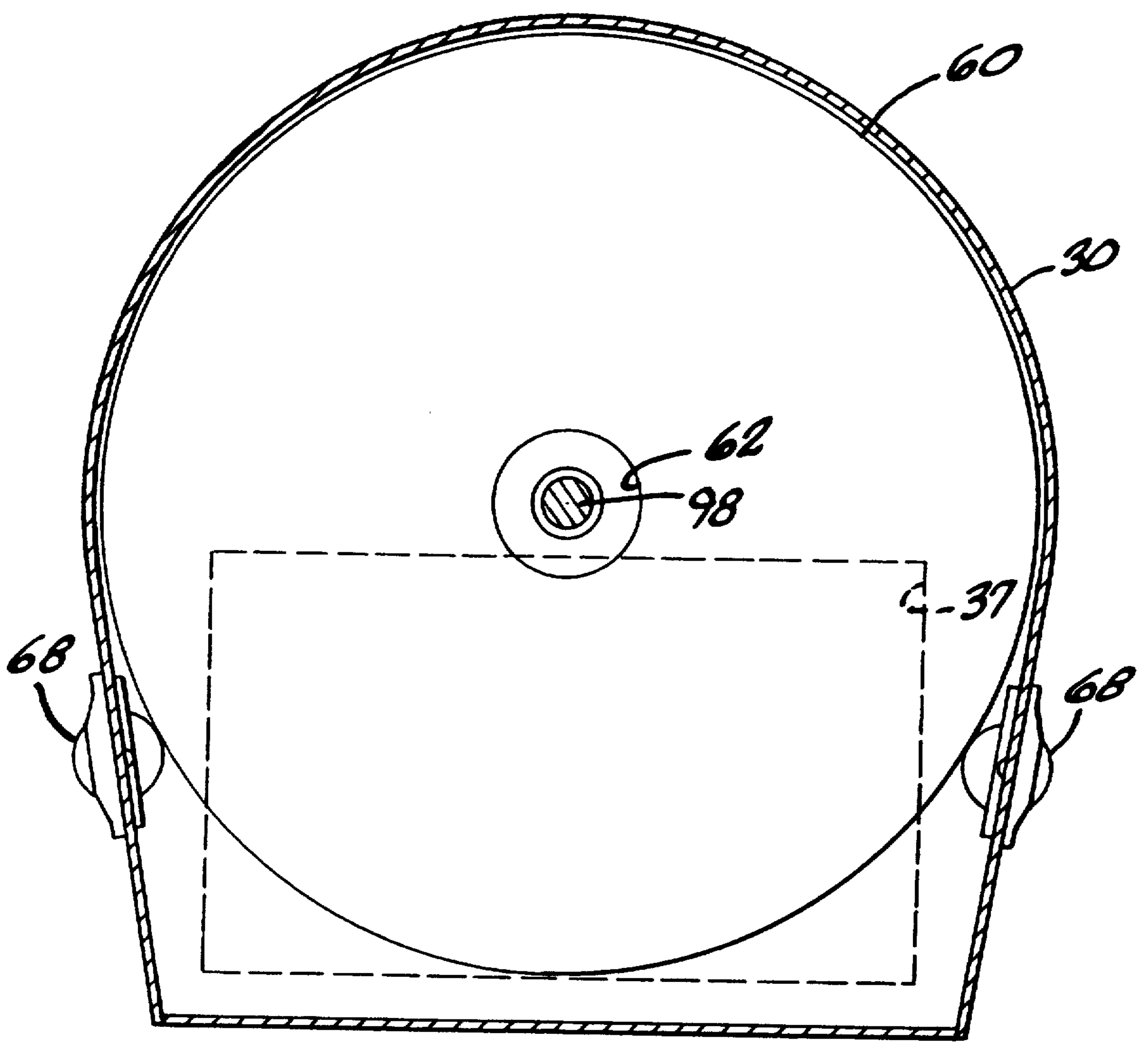
FIG. 4 is a cross sectional view of FIG. 2 taken along line 4—4.
Figure 5:
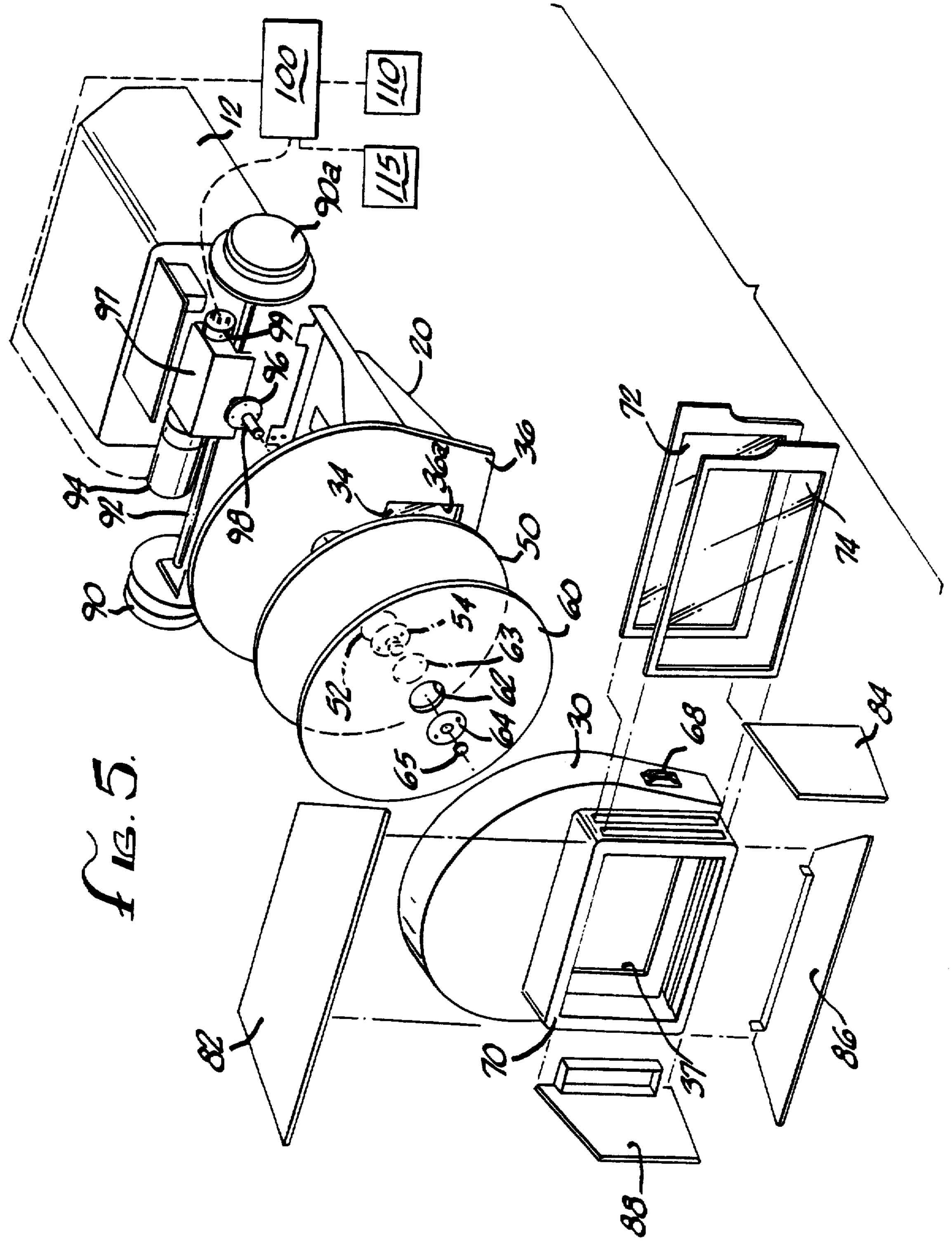
FIG. 5 is an exploded view of the light apparatus of FIGS. 1–4.

Alternately, if the side to side (in the illustrated example left to right) unevenness in attenuation becomes too critical, FIG. 7 illustrates an alternative embodiment having two neutral density disks 120, 130 replacing the single neutral density disk 50 of the previous embodiment with a pair of disks 120, 130. The first and second disks 120, 130 are mounted on a shaft 140 having an internal rotational element 142 and an external rotational element 144. The first disk 120 has a clear section 122 and a linearly increasing neutral density section 124. Similarly, the second disk 130 has a 90° clear section 132 and a 270° gradually linearly increasing neutral density section 134. The first disk 120 is mounted on the outer shaft element 144 and the second disk is mounted on the inner shaft element 142. The disks 120, 130 are counter-rotated and the neutral density sections 124, 134 are configured in opposite orientations so that during counter-rotation of the two disks 120, 130 there will be in summation approximately equal attenuation from left to right across the aperture 36a.

Though a disk-shaped neutral density element is the preferred geometry, other geometries may be suitable depending upon the particular application. For example, in FIG. 8, a rectangular neutral density element 150 has a clear section 152 and a gradually increasing neutral density section 154. By rotation of a drive element 158, the rectangular neutral density filter 150 is moved from side to side to provide the desired amount of attenuating filter medium in the light path.

If side to side attenuation variation becomes undesirable, a dual rectangular filter design may be employed as illustrated in FIG. 9. A first rectangular neutral filter 160 having a clear section 162 and a gradually linearly increasing neutral density filter 164 is positioned in the light path with its clear section on the right side of the outgoing light. A second rectangular neutral density filter 170 is positioned adjacent the first rectangular neutral density filter 160. The second rectangular neutral density filter 170 has a clear section 172 and a linearly increasing neutral density section 174. The clear section of the second rectangular filter is positioned on the left side of the aperture. The position of the first rectangular filter 160 is changed by rotation of shaft 166 and gear 168. A conventional rack and pinion system may be provided to accomplish the desired movements. The shaft 176 and gear 178 controlling position of the second rectangular neutral density filter 170 rotate in the opposite directions to provide a balanced summation of attenuation of light passing through the two rectangular neutral density filters 160, 170.

Though a disk-shaped color correct wheel is the preferred geometry, other geometries may be suitable depending upon the particular application. For example, the color correct filter may be rectangular similar to the shape of the neutral density filter 150 illustrated in FIG. 8. Alternately, if the side to side (in the illustrated example left to right) unevenness in attenuation becomes too critical, two color correcting filters may be employed in a configuration similar to the neutral density disks of FIGS. 7 or 9.

Thus, an apparatus and method for varying the intensity of light have been shown and described. Though certain examples and advantages have been disclosed, further advantages and modifications may become obvious to one skilled in the art from the disclosures herein. The invention therefore is not to be limited except in the spirit of the claims that follow.

What is claimed is:

1. An apparatus for providing variable intensity light comprising a light source;

an outgoing aperture;

a reflector positioned adjacent the light source directing light from the light source along an outgoing light path through the outgoing aperture;

a primary movable neutral density filter having a portion aligned in the outgoing light path, the neutral density filter comprising a first clear section and a second neutral density section, the second neutral density section being continuously variable, gradually increasing in density from a near zero density at an interface with the first clear section to a selected higher density at an opposite end of the second neutral density section, wherein the neutral density filter being generally color neutral; and a diffuser positioned in the outgoing light path downstream of the neutral density filter; and a secondary movable neutral density filter positioned in series with the primary neutral density filter, the secondary neutral density filter comprising a first clear section and a second neutral density section, the second neutral density section being continuously variable, gradually increasing in density from a near zero density at an interface with the first clear section to a selected higher density at an opposite end of the second neutral density section, wherein the secondary neutral density filter being generally color neutral, wherein the primary and secondary neutral density filters are movable in opposite directions so as to achieve in summation therethrough approximately equal attenuation throughout a width of the light path.

2. An apparatus for providing variable intensity light according to claim 1 wherein the neutral density filter comprises a circular disk positioned in a plane generally perpendicular to the outgoing light path, the circular disk having (a) a clear arcuate section and (b) a variable density arcuate section of gradually increasing density extending from a first edge of the clear arcuate section to the other edge thereof.

3. An apparatus for providing variable intensity light according to claim 2 further comprising a motor, a transmission driven by the motor, and a shaft rotationally driven by the transmission, wherein the neutral density disk is concentrically mounted to the shaft whereby operation of the motor rotates the neutral density disk about its central axis.

4. An apparatus for providing variable intensity light according to claim 2 wherein the clear arcuate section comprises an arc of about 90°.

5. An apparatus for providing variable intensity light according to claim 2 wherein the variable density arcuate section comprises an arc of about 270°.

6. An apparatus for providing variable intensity light according to claim 1 comprising only one neutral density filter for varying intensity of the light.

7. An apparatus for providing variable intensity light according to claim 1 wherein the variable neutral density filter comprises a rectangular filter element having (a) a clear section and (b) a variable density section of gradually increasing density extending from a first edge of the clear section to the other edge thereof.

8. An apparatus for providing variable intensity light according to claim 1 further comprising a color correcting optical filter, wherein the color correcting optical filter comprises a circular disk having (a) a clear arcuate section and (b) a variable density arcuate section of gradually increasing color correcting property extending from a first edge of the clear arcuate section to the other edge thereof.

9. An apparatus for providing variable intensity light comprising a light source;

an outgoing aperture;

a reflector positioned adjacent the light source directing light from the light source along an outgoing light path through the outgoing aperture;

a primary movable neutral density filter having a portion aligned in the outgoing light path, the neutral density filter comprising a first clear section and a second neutral density section, the second neutral density section being continuously variable, gradually increasing in density from a near zero density at an interface with the first clear section to a selected higher density at an opposite end of the second neutral density section, wherein the neutral density filter being generally color neutral;

a first diffuser positioned in the outgoing light path downstream of the neutral density filter; and a second diffuser in the outgoing light path downstream of the neutral density filter.

10. A movie camera system having a camera housing with a picture recording mechanism, a lens system including a lens focusing mechanism, and a lighting system, the lighting system comprising a light source;

an outgoing aperture;

a reflector positioned adjacent the light source directing light from the light source along an outgoing light path through the outgoing aperture;

a movable neutral density filter having a portion aligned in the outgoing light path, the neutral density filter comprising a first clear section and a second neutral density section, the second neutral density section being continuously variable, gradually increasing in density from a near zero density at an interface with the first clear section to a selected higher density at an opposite end of the second neutral density section, wherein the neutral density filter being generally color neutral; and a diffuser positioned in the outgoing light path downstream of the neutral density filter.

11. A movie camera system according to claim 10 further comprising a motor, a transmission driven by the motor, and a shaft rotationally driven by the transmission, wherein the neutral density filter is operatively connected to the shaft whereby operation of the motor adjusts the position of the neutral density filter for varying alignment of the neutral density filter placing a selectively higher or lower density section in the outgoing light path.

12. A movie camera system according to claim 11 further comprising a controller in communication with the motor and with the lens focusing mechanism wherein the controller regulates operation of the motor in response to adjustment of the lens focusing mechanism.

13. A movie camera system according to claim 10 wherein the neutral density filter comprises a circular disk positioned in a plane generally perpendicular to the outgoing light path, the circular disk having (a) a clear arcuate section and (b) a variable density arcuate section of gradually increasing density extending from a first edge of the clear arcuate section to the other edge thereof.

14. A movie camera system according to claim 13 further comprising a motor, a transmission driven by the motor, and a shaft rotationally driven by the transmission, wherein the neutral density disk is concentrically mounted to the shaft whereby operation of the motor rotates the neutral density disk about its central axis.

15. A movie camera system according to claim 14 further comprising a controller in communication with the motor and with the lens focusing mechanism wherein the controller regulates operation of the motor in response to adjustment of the lens focusing mechanism.

16. A movie camera system according to claim 10 further comprising a color correcting filter disposed in the outgoing light path.

17. A movie camera system according to claim 10 wherein the clear arcuate section comprises an arc of about 90°.

18. A movie camera system according to claim 10 wherein the variable density arcuate section comprises an arc of about 270°.

19. A movie camera system according to claim 10 further comprising a color temperature correcting optical filter, wherein the color temperature correcting optical filter comprises a circular disk having (a) a clear arcuate section and (b) a variable density arcuate section of gradually increasing color temperature correcting property extending from a first edge of the clear arcuate section to the other edge thereof.

20. A movie camera system having a camera housing with a picture recording mechanism, a lens system including a lens focusing mechanism, and a lighting system, the lighting system comprising a light source;

an outgoing aperture;

means for directing light from the light source along an outgoing light path through the outgoing aperture;

a movable neutral density filter having a portion aligned in the outgoing light path, the neutral density filter comprising a first relatively clear section and a second neutral density section, the second neutral density section being variable having increasing density from a selected low density at an interface with the clear section to a selected higher density at an opposite end of the second neutral density section;

a drive mechanism operably connected to the neutral density filter whereby operation of the drive mechanism adjusts the position of the neutral density filter for varying alignment of the neutral density filter placing a selectively higher or lower density section in the outgoing light path;

a controller in communication with the drive mechanism and with the lens focusing mechanism wherein the controller regulates operation of the drive mechanism in response to adjustment of the lens focusing mechanism.

21. A movie camera system according to claim 20 wherein the second neutral density section is of continuously variable density, gradually increasing from the selected low density to the selected higher density.

22. A method of varying the intensity of light from a light source for use in a camera system, comprising the steps of:

generating light from a light source;

directing light from the light source along an outgoing light path and through a neutral density filter element having a first clear section and a second neutral density section, the second neutral density section being variable, increasing in density from a near zero density at an interface with the first clear section to a selected higher density at an opposite end of the second neutral density section, wherein the neutral density filter being generally color neutral;

moving the neutral density filter to selectively position in the outgoing light path a section of the neutral density filter with a desired density;

passing the light through a diffuser;

detecting change in a setting of a system actuator in the camera system; and adjusting the position of the neutral density filter in response to the change in the setting of the system actuator detected.

23. A method according to claim 22 wherein the second neutral density section is of continuously variable density, gradually increasing from the selected low density to the selected higher density.

24. A method of varying the intensity of light from a light source for use in a camera system comprising the steps of:

generating light from a light source;

directing light from the light source along an outgoing light path and through a neutral density filter element having a first clear section and a second neutral density section, the second neutral density section being continuously variable, gradually increasing in density from a near zero density at an interface with the first clear section to a selected higher density at an opposite end of the second neutral density section, wherein the neutral density filter being generally color neutral;

moving the neutral density filter to selectively position in the outgoing light path a section of the neutral density filter with a desired density;

detecting the focus position of the camera prime lens system; and controlling the neutral density filter position in response to the focus position detected.

25. A method of varying the intensity of light according to claim 24 further comprising calibrating the neutral density filter position to the focus position of the camera prime lens system by setting one end of a near distance setting of the focus position to correspond to a given low intensity setting of the neutral density filter position, setting the other end of a far distance setting of the focus position to correspond to a given high intensity setting of the neutral density filter position, and interpolating for corresponding settings therebetween.

26. A lighting system comprising a light source;

an outgoing aperture;

means for directing light from the light source along an outgoing light path through the outgoing aperture;

a movable color temperature correcting filter having a portion aligned in the outgoing light path, the color temperature correcting filter comprising a first relatively clear section and a second color temperature correcting section, the second color temperature correcting section being variable having increased color temperature correcting density from a selected low density adjacent an interface with the clear section to a selected higher density adjacent an opposite end of the second color temperature correcting section; and a drive mechanism operable connected to the color temperature correcting filter whereby operation of the drive mechanism adjusts the position of the color temperature correcting filter for varying alignment of the color temperature correcting filter placing a selectively higher or lower density section thereof in the outgoing light path.

27. A lighting system according to claim 26 further comprising an output controller responsive to color temperature of the light source which adjusts position of the color temperature correcting filter in response to change in color temperature of the light source.

28. A lighting system comprising a light source;

an outgoing aperture;

means for directing light from the light source along an outgoing light path through the outgoing aperture;

a movable color temperature correcting filter having a portion aligned in the outgoing light path, the color temperature correcting filter comprising a first relatively clear section and a second color temperature correcting section, the second color temperature correcting section being variable having increased color temperature correcting density from a selected low density adjacent an interface with the clear section to a selected higher density adjacent an opposite end of the second color temperature correcting section; and a drive mechanism operably connected to the color temperature correcting filter whereby operation of the drive mechanism adjusts the position of the color temperature correcting filter for varying alignment of the color temperature correcting filter placing a selectively higher or icier density section thereof in the outgoing light path, wherein the movable color temperature correcting filter comprises a circular disk and the first relatively clear section comprises an arcuate section of about 90°.

29. A lighting system comprising a light source;

an outgoing aperture;

means for directing light from the light source along an outgoing light path through the outgoing apertures;

a movable color temperature correcting filter having a portion aligned in the outgoing light path, the color temperature correcting filter comprising a first relatively clear section and a second color temperature correcting section, the second color temperature correcting section being variable having increased color temperature correcting density from a selected low density adjacent an interface with the clear section to a selected higher density adjacent an opposite end of the second color temperature correcting section; and a drive mechanism operably connected to the color temperature correcting filter whereby operation of the drive mechanism adjusts the position of the color temperature correcting filter for varying alignment of the color temperature correcting filter placing a selectively higher or lower density section thereof in the outgoing light path, wherein the movable color temperature correcting filter comprises a circular disk and the second color temperature correcting section comprises an arcuate section of about 270°.

30. A lighting system according to claim 26 wherein the second color temperature correcting section is of continuously variable density, gradually increasing from the selected low density to the selected higher density.

31. A lighting system according to claim 26 wherein the movable color temperature correcting filter comprises a circular disk which is rotatably movable in the outgoing light path.

32. A lighting system according to claim 29 wherein the second color temperature correcting section is of continuously variable density, gradually increasing from the selected low density to the selected higher density.

* * * * *

UNITED STATES PATENT AND TRADEMARK OFFICE

CERTIFICATE OF CORRECTION

PATENT NO. : 5,371,655

DATED : December 6, 1994

INVENTOR(S) : Nolan J. Murdock and Felipe Navarro

It is certified that error appears in the above-indentified patent and that said Letters Patent is hereby corrected as shown below:

In column 7, line 4, delete "and".

In column 10, line 62, change "operable" to --operably--.

In column 11, line 31, change "icier" to --lower--.

Signed and Sealed this

Sixteenth Day of May, 1995

Attest:

BRUCE LEHMAN

*Attesting Officer* *Commissioner of Patents and Trademarks*